(12) United States Patent
Krzych et al.

(10) Patent No.: US 10,852,441 B2
(45) Date of Patent: Dec. 1, 2020

(54) METHOD AND SYSTEM FOR ASSET MANAGEMENT

(71) Applicant: Estimote Polska Sp. z o. o., Cracow (PL)

(72) Inventors: Jakub Krzych, Cracow (PL); Lukasz Kostka, Cracow (PL)

(73) Assignee: Estimote Polska Sp z o.o., Cracow (PL)

( * ) Notice: Subject to any disclaimer, the term of this patent is extended or adjusted under 35 U.S.C. 154(b) by 0 days.

(21) Appl. No.: 16/551,379

(22) Filed: Aug. 26, 2019

(65) Prior Publication Data

US 2020/0064487 A1   Feb. 27, 2020

Related U.S. Application Data

(60) Provisional application No. 62/881,766, filed on Aug. 1, 2019, provisional application No. 62/772,534, filed (Continued)

(51) Int. Cl.

| | |
|---|---|
| *G01S 19/11* | (2010.01) |
| *G01S 19/49* | (2010.01) |
| *H04B 17/318* | (2015.01) |
| *G06F 7/58* | (2006.01) |
| *H04W 12/00* | (2009.01) |
| *H04W 4/029* | (2018.01) |
| *H04W 4/80* | (2018.01) |
| *H04W 12/06* | (2009.01) |
| *H04L 29/08* | (2006.01) |

(52) U.S. Cl.
CPC ............... *G01S 19/11* (2013.01); *G01S 19/49* (2013.01); *G06F 7/588* (2013.01); *H04B 17/318* (2015.01); *H04L 67/02* (2013.01); *H04W 4/029* (2018.02); *H04W 4/80* (2018.02); *H04W 12/001* (2019.01); *H04W 12/0609* (2019.01)

(58) Field of Classification Search
CPC ....... G01S 19/11; G01S 19/49; H04B 17/318; H04W 4/029; H04W 4/80; H04W 12/0609; H04W 12/001; G06F 7/588; H04L 67/02
USPC ...................................................... 455/456.1
See application file for complete search history.

(56) References Cited

U.S. PATENT DOCUMENTS

| | | |
|---|---|---|
| 6,091,358 A | 7/2000 | Maniscalco et al. |
| 6,362,778 B2 | 3/2002 | Neher |

(Continued)

FOREIGN PATENT DOCUMENTS

| | | |
|---|---|---|
| AU | 2016101053 A4 | 8/2016 |
| CN | 102819804 A | 12/2012 |

(Continued)

OTHER PUBLICATIONS

Burnside, Matt, et al. "Proxy-based security protocols in networked mobile devices." Proceedings of the 2002 ACM symposium on Applied computing. ACM, 2002. (Year: 2002).

(Continued)

*Primary Examiner* — Mong-Thuy T Tran
(74) *Attorney, Agent, or Firm* — Jeffrey Schox; Diana Lin

(57) ABSTRACT

An asset management system can include one or more beacons, a remote computing system, and a program. The asset tracking method can include operating the beacon according to programmable instructions, and can additionally or alternatively learn to detect events.

18 Claims, 7 Drawing Sheets

US 10,852,441 B2

Page 2

Related U.S. Application Data on Nov. 28, 2018, provisional application No. 62/722,397, filed on Aug. 24, 2018.

(56) References Cited

U.S. PATENT DOCUMENTS

| | | | |
|---|---|---|---|
| 6,775,258 B1 | 8/2004 | Van et al. | |
| 6,873,258 B2 | 3/2005 | Marples et al. | |
| 6,965,575 B2 | 11/2005 | Srikrishna et al. | |
| 7,027,808 B2 | 4/2006 | Wesby | |
| 7,038,584 B2 | 5/2006 | Carter | |
| 7,072,671 B2 | 7/2006 | Leitch | |
| 7,146,178 B2 | 12/2006 | Lehikoinen et al. | |
| 7,283,846 B2 | 10/2007 | Spriestersbach et al. | |
| 7,312,752 B2 | 12/2007 | Smith et al. | |
| 7,366,113 B1 | 4/2008 | Chandra et al. | |
| 7,458,825 B2 | 12/2008 | Atsmon et al. | |
| 7,499,462 B2 | 3/2009 | MacMullan et al. | |
| 7,639,131 B2 | 12/2009 | Mock et al. | |
| 7,705,728 B2 | 4/2010 | Mock et al. | |
| 7,706,282 B2 | 4/2010 | Huang | |
| 7,835,505 B2 | 11/2010 | Toyama et al. | |
| 7,855,679 B1 | 12/2010 | Braiman | |
| 7,865,306 B2 | 1/2011 | Mays | |
| 7,983,677 B2 | 7/2011 | Dacosta | |
| 8,058,988 B1 | 11/2011 | Medina et al. | |
| 8,139,945 B1 | 3/2012 | Amir et al. | |
| 8,160,056 B2 | 4/2012 | Van et al. | |
| 8,260,320 B2 | 9/2012 | Herz | |
| 8,265,621 B2 | 9/2012 | Kopikare et al. | |
| 8,407,417 B2 | 3/2013 | Matsuda et al. | |
| 8,489,112 B2 | 7/2013 | Roeding et al. | |
| 8,520,648 B2 | 8/2013 | Cordeiro | |
| 8,559,975 B2 | 10/2013 | Basu et al. | |
| 8,566,839 B2 | 10/2013 | Johnson et al. | |
| 8,594,850 B1 | 11/2013 | Gourlay et al. | |
| 8,600,341 B2 | 12/2013 | Johnson | |
| 8,612,604 B2 | 12/2013 | Beatty et al. | |
| 8,634,796 B2 | 1/2014 | Johnson | |
| 8,639,267 B2 | 1/2014 | Johnson | |
| 8,644,255 B1 | 2/2014 | Burcham et al. | |
| 8,694,060 B2 | 4/2014 | Vanderaa et al. | |
| 8,694,782 B2 | 4/2014 | Lambert | |
| 8,718,598 B2 | 5/2014 | Johnson | |
| 8,723,720 B2 | 5/2014 | Moffatt et al. | |
| 8,750,823 B2 | 6/2014 | Johnson | |
| 8,750,841 B2 | 6/2014 | Johnson et al. | |
| 8,761,751 B2 | 6/2014 | Johnson et al. | |
| 8,761,804 B2 | 6/2014 | Johnson | |
| 8,781,502 B1 | 7/2014 | Middleton et al. | |
| 8,791,901 B2 | 7/2014 | Mallinson | |
| 8,797,214 B2 | 8/2014 | Taylor et al. | |
| 8,844,007 B2 | 9/2014 | Vicente et al. | |
| 8,847,754 B2 | 9/2014 | Buchheim et al. | |
| 8,855,922 B1 | 10/2014 | Starenky et al. | |
| 8,867,993 B1 | 10/2014 | Perkins et al. | |
| 8,868,133 B1 | 10/2014 | Rosenbaum et al. | |
| 8,886,226 B2 | 11/2014 | Johnson | |
| 8,886,230 B2 | 11/2014 | Sydir et al. | |
| 8,887,177 B2 | 11/2014 | Johnson et al. | |
| 8,896,485 B2 | 11/2014 | Mendelson | |
| 8,897,741 B2 | 11/2014 | Johnson | |
| 8,897,742 B2 | 11/2014 | Johnson | |
| 8,911,932 B2 | 12/2014 | Sun | |
| 8,923,806 B2 | 12/2014 | Johnson | |
| 8,934,389 B2 | 1/2015 | Kuehnel et al. | |
| 8,938,196 B2 | 1/2015 | Bradish et al. | |
| 8,942,693 B2 | 1/2015 | Johnson | |
| 8,942,732 B2 | 1/2015 | Johnson | |
| 8,942,733 B2 | 1/2015 | Johnson | |
| 8,971,850 B2 | 3/2015 | Klein et al. | |
| 8,971,932 B2 | 3/2015 | Mapes | |
| 8,988,221 B2 | 3/2015 | Raji et al. | |
| 8,996,030 B2 | 3/2015 | Grainger et al. | |
| 9,014,658 B2 | 4/2015 | Johnson | |
| 9,014,715 B2 | 4/2015 | Alizadeh-Shabdiz et al. | |
| 9,026,134 B2 | 5/2015 | Edge | |
| 9,033,255 B2 | 5/2015 | Tessier et al. | |
| 9,036,792 B2 | 5/2015 | Cacioppo et al. | |
| 9,055,406 B2 | 6/2015 | Johnson | |
| 9,063,212 B2 | 6/2015 | Jones | |
| 9,078,095 B2 | 7/2015 | Johnson | |
| 9,088,868 B2 | 7/2015 | Johnson | |
| 9,088,869 B2 | 7/2015 | Johnson | |
| 9,100,792 B2 | 8/2015 | Johnson | |
| 9,113,295 B2 | 8/2015 | Johnson | |
| 9,113,309 B2 | 8/2015 | Uilecan et al. | |
| 9,113,343 B2 | 8/2015 | Moshfeghi | |
| 9,140,796 B2 | 9/2015 | Zhou | |
| 9,143,890 B2 | 9/2015 | Jose et al. | |
| 9,154,565 B2 | 10/2015 | Monighetti | |
| 9,202,245 B2 | 12/2015 | Kostka et al. | |
| 9,204,275 B2 | 12/2015 | Johnson et al. | |
| 9,253,597 B2 | 2/2016 | Johnson | |
| 9,258,674 B2 | 2/2016 | Chen | |
| 9,282,436 B2 | 3/2016 | Chitre et al. | |
| 9,282,582 B1 | 3/2016 | Dunsbergen et al. | |
| 9,307,355 B2 | 4/2016 | Nehrenz et al. | |
| 9,351,114 B2 | 5/2016 | Chatterjee et al. | |
| 9,361,630 B1 | 6/2016 | Goswami | |
| 9,392,408 B2 | 7/2016 | Johnson | |
| 9,398,422 B2 | 7/2016 | Zampini | |
| 9,408,060 B2 | 8/2016 | Helms et al. | |
| 9,424,699 B2 | 8/2016 | Kusens et al. | |
| 9,445,238 B2 | 9/2016 | Johnson et al. | |
| 9,445,305 B2 | 9/2016 | Lyon et al. | |
| 9,456,303 B2 | 9/2016 | Johnson | |
| 9,462,469 B2 | 10/2016 | Hillyard | |
| 9,471,917 B2 | 10/2016 | Govindarajan et al. | |
| 9,474,962 B2 | 10/2016 | Barney et al. | |
| 9,491,575 B2 | 11/2016 | Edge et al. | |
| 9,544,744 B2 | 1/2017 | Postrel | |
| 9,551,774 B2 | 1/2017 | Ishida et al. | |
| 9,558,507 B2 | 1/2017 | Zilkha | |
| 9,571,957 B2 | 2/2017 | Granbery | |
| 9,584,993 B2 | 2/2017 | Johnson et al. | |
| 9,591,570 B2 | 3/2017 | Kubo et al. | |
| 9,609,487 B2 | 3/2017 | Alshihi | |
| 9,621,446 B2 | 4/2017 | Pugh et al. | |
| 9,622,046 B2 | 4/2017 | Otis et al. | |
| 9,622,208 B2 | 4/2017 | Mycek et al. | |
| 9,629,064 B2 | 4/2017 | Graves et al. | |
| 9,634,928 B2 | 4/2017 | Choudhury et al. | |
| 9,642,173 B2 | 5/2017 | Granbery | |
| 9,648,662 B2 | 5/2017 | Herrala et al. | |
| 9,652,124 B2 | 5/2017 | Cotier et al. | |
| 9,684,826 B2 | 6/2017 | Dubuque | |
| 9,684,925 B2 | 6/2017 | Khalid et al. | |
| 9,689,955 B2 | 6/2017 | Rosenbaum | |
| 9,712,967 B2 | 7/2017 | Kostka et al. | |
| 9,826,356 B2 | 11/2017 | Mycek et al. | |
| 9,843,591 B2 | 12/2017 | Bliss | |
| 9,866,996 B1 | 1/2018 | Krzych et al. | |
| 9,867,009 B2 | 1/2018 | Mycek et al. | |
| 9,922,294 B2 | 3/2018 | Raina et al. | |
| 9,998,867 B2 | 6/2018 | Keithley | |
| 10,111,034 B2 | 10/2018 | Johnson | |
| 10,149,159 B1* | 12/2018 | Perfitt | H04W 12/1008 |
| 10,292,011 B2 | 5/2019 | Johnson | |
| 2001/0026240 A1 | 10/2001 | Neher | |
| 2002/0167919 A1 | 11/2002 | Marples et al. | |
| 2002/0176388 A1 | 11/2002 | Rankin et al. | |
| 2003/0084539 A1 | 5/2003 | Wartian | |
| 2003/0100315 A1 | 5/2003 | Rankin | |
| 2003/0146835 A1 | 8/2003 | Carter | |
| 2003/0148775 A1 | 8/2003 | Spriestersbach et al. | |
| 2004/0008663 A1 | 1/2004 | Srikrishna et al. | |
| 2004/0190447 A1 | 9/2004 | Dacosta | |
| 2004/0264372 A1 | 12/2004 | Huang | |
| 2004/0264466 A1 | 12/2004 | Huang | |
| 2005/0162271 A1 | 7/2005 | Leitch | |
| 2005/0222933 A1 | 10/2005 | Wesby | |
| 2006/0163349 A1 | 7/2006 | Neugebauer | |
| 2006/0181411 A1* | 8/2006 | Fast | G01S 5/0018 340/539.13 |

(56) References Cited

U.S. PATENT DOCUMENTS

| | | | |
|---|---|---|---|
| 2006/0209745 A1 | 9/2006 | MacMullan et al. |
| 2006/0259942 A1 | 11/2006 | Toyama et al. |
| 2006/0290519 A1 | 12/2006 | Boate et al. |
| 2007/0067104 A1 | 3/2007 | Mays |
| 2007/0069923 A1 | 3/2007 | Mendelson |
| 2007/0243769 A1 | 10/2007 | Atsmon et al. |
| 2007/0247366 A1 | 10/2007 | Smith et al. |
| 2008/0056215 A1 | 3/2008 | Kopikare et al. |
| 2008/0062891 A1 | 3/2008 | Van et al. |
| 2008/0068519 A1 | 3/2008 | Adler et al. |
| 2008/0139306 A1 | 6/2008 | Lutnick et al. |
| 2008/0143516 A1 | 6/2008 | Mock et al. |
| 2008/0143604 A1 | 6/2008 | Mock et al. |
| 2008/0231460 A1 | 9/2008 | Owen et al. |
| 2009/0005079 A1 | 1/2009 | Shields et al. |
| 2009/0009398 A1 | 1/2009 | Taylor et al. |
| 2009/0131079 A1 | 5/2009 | Sekhar |
| 2009/0311976 A1 | 12/2009 | Vanderaa et al. |
| 2009/0327135 A1 | 12/2009 | Nguyen et al. |
| 2010/0019924 A1 | 1/2010 | D'Alessandro et al. |
| 2010/0093374 A1 | 4/2010 | Dacosta |
| 2010/0099435 A1 | 4/2010 | Druzinic-Fiebach et al. |
| 2010/0100582 A1 | 4/2010 | Beatty et al. |
| 2010/0102929 A1 | 4/2010 | Haumann |
| 2010/0105353 A1 | 4/2010 | Cacioppo et al. |
| 2010/0120450 A1 | 5/2010 | Herz |
| 2010/0168924 A1 | 7/2010 | Tessier et al. |
| 2010/0317371 A1 | 12/2010 | Migos et al. |
| 2011/0028160 A1 | 2/2011 | Roeding et al. |
| 2011/0029359 A1 | 2/2011 | Roeding et al. |
| 2011/0102171 A1 | 5/2011 | Raji et al. |
| 2011/0178863 A1 | 7/2011 | Daigle |
| 2011/0238188 A1 | 9/2011 | Washiro |
| 2011/0305228 A1 | 12/2011 | Cordeiro |
| 2011/0306357 A1 | 12/2011 | Alizadeh-Shabdiz et al. |
| 2012/0057518 A1 | 3/2012 | Herrala et al. |
| 2012/0095805 A1 | 4/2012 | Ghosh et al. |
| 2012/0112055 A1 | 5/2012 | Castro-Perez et al. |
| 2012/0172055 A1 | 7/2012 | Edge |
| 2012/0190386 A1 | 7/2012 | Anderson |
| 2012/0246795 A1 | 10/2012 | Scheffler et al. |
| 2012/0258730 A1 | 10/2012 | Tinnakornsrisuphap et al. |
| 2012/0260323 A1 | 10/2012 | San Vicente et al. |
| 2012/0262365 A1 | 10/2012 | Mallinson |
| 2012/0280862 A1 | 11/2012 | Moffatt et al. |
| 2012/0284517 A1 | 11/2012 | Lambert |
| 2012/0295535 A1 | 11/2012 | Bradish et al. |
| 2012/0309256 A1 | 12/2012 | Theodore |
| 2012/0316960 A1 | 12/2012 | Yang |
| 2012/0320815 A1 | 12/2012 | Massena |
| 2013/0023282 A1 | 1/2013 | Lin et al. |
| 2013/0030915 A1 | 1/2013 | Statler et al. |
| 2013/0063303 A1 | 3/2013 | Zhou |
| 2013/0065584 A1 | 3/2013 | Lyon et al. |
| 2013/0165157 A1 | 6/2013 | Mapes |
| 2013/0182625 A1 | 7/2013 | Kuehnel et al. |
| 2013/0184002 A1 | 7/2013 | Moshfeghi |
| 2013/0203445 A1 | 8/2013 | Grainger et al. |
| 2013/0225197 A1 | 8/2013 | McGregor et al. |
| 2013/0226704 A1 | 8/2013 | Fernandez |
| 2013/0288668 A1 | 10/2013 | Pragada et al. |
| 2013/0295879 A1 | 11/2013 | Mahalingam |
| 2013/0337771 A1 | 12/2013 | Klein et al. |
| 2014/0018621 A1 | 1/2014 | Jose et al. |
| 2014/0087758 A1 | 3/2014 | Maor |
| 2014/0106782 A1 | 4/2014 | Chitre et al. |
| 2014/0122703 A1 | 5/2014 | Pugh et al. |
| 2014/0122855 A1 | 5/2014 | Maneval |
| 2014/0135042 A1 | 5/2014 | Buchheim et al. |
| 2014/0148196 A1 | 5/2014 | Bassan-Eskenazi et al. |
| 2014/0149577 A1 | 5/2014 | Monighetti |
| 2014/0180817 A1 | 6/2014 | Zilkha |
| 2014/0219118 A1 | 8/2014 | Middleton et al. |
| 2014/0220883 A1 | 8/2014 | Emigh et al. |
| 2014/0228044 A1 | 8/2014 | Jones |
| 2014/0277654 A1 | 9/2014 | Reinhardt et al. |
| 2014/0302869 A1 | 10/2014 | Rosenbaum et al. |
| 2015/0005011 A1 | 1/2015 | Nehrenz et al. |
| 2015/0031388 A1 | 1/2015 | Chatterjee et al. |
| 2015/0038171 A1 | 2/2015 | Uilecan et al. |
| 2015/0058355 A1 | 2/2015 | Naqvi |
| 2015/0079942 A1 | 3/2015 | Kostka et al. |
| 2015/0081474 A1* | 3/2015 | Kostka ............ H04W 4/21 705/26.8 |
| 2015/0094140 A1 | 4/2015 | Barney et al. |
| 2015/0106196 A1 | 4/2015 | Williams et al. |
| 2015/0163828 A1 | 6/2015 | Vandwalle et al. |
| 2015/0245305 A1 | 8/2015 | Camps Mur |
| 2015/0248667 A1 | 9/2015 | Govindarajan et al. |
| 2015/0276432 A1 | 10/2015 | Repyevsky et al. |
| 2015/0279115 A1 | 10/2015 | Vukicevic |
| 2015/0289207 A1 | 10/2015 | Kubo et al. |
| 2015/0294398 A1 | 10/2015 | Khalid et al. |
| 2015/0295333 A1 | 10/2015 | Shibuya et al. |
| 2015/0296048 A1 | 10/2015 | Gerding et al. |
| 2015/0296333 A1 | 10/2015 | Chen |
| 2015/0334548 A1 | 11/2015 | Liu et al. |
| 2015/0347959 A1 | 12/2015 | Skaaksrud |
| 2015/0351008 A1 | 12/2015 | Mayor |
| 2015/0355308 A1 | 12/2015 | Ishida et al. |
| 2015/0365790 A1 | 12/2015 | Edge et al. |
| 2015/0379576 A1 | 12/2015 | Otis et al. |
| 2015/0382153 A1 | 12/2015 | Otis et al. |
| 2016/0006837 A1 | 1/2016 | Reynolds et al. |
| 2016/0007315 A1 | 1/2016 | Lundgreen et al. |
| 2016/0014609 A1 | 1/2016 | Goel et al. |
| 2016/0021687 A1 | 1/2016 | Granbery |
| 2016/0042767 A1 | 2/2016 | Araya et al. |
| 2016/0049028 A1 | 2/2016 | Kusens et al. |
| 2016/0055428 A1 | 2/2016 | Raina et al. |
| 2016/0063550 A1 | 3/2016 | Caldwell |
| 2016/0086029 A1 | 3/2016 | Dubuque |
| 2016/0086460 A1 | 3/2016 | King et al. |
| 2016/0094398 A1 | 3/2016 | Choudhury et al. |
| 2016/0094598 A1 | 3/2016 | Gedikian |
| 2016/0094946 A1* | 3/2016 | Keithley ............ H04W 4/023 455/456.3 |
| 2016/0099758 A1 | 4/2016 | Bell et al. |
| 2016/0105788 A1 | 4/2016 | Helms et al. |
| 2016/0123745 A1 | 5/2016 | Cotier et al. |
| 2016/0127875 A1* | 5/2016 | Zampini, II ............ H04W 4/80 370/311 |
| 2016/0188919 A1 | 6/2016 | Gao et al. |
| 2016/0192407 A1 | 6/2016 | Fyfe et al. |
| 2016/0277999 A1 | 9/2016 | Graves et al. |
| 2016/0291127 A1 | 10/2016 | Huang et al. |
| 2016/0343032 A1* | 11/2016 | DeWitt ............ G06Q 10/02 |
| 2016/0345126 A1 | 11/2016 | Granbery |
| 2017/0013450 A1* | 1/2017 | Ziv ............ H04W 12/06 |
| 2017/0019765 A1 | 1/2017 | Hoyer et al. |
| 2017/0064667 A1 | 3/2017 | Mycek et al. |
| 2017/0079001 A1 | 3/2017 | Lewis |
| 2017/0099567 A1 | 4/2017 | Kwon et al. |
| 2017/0245104 A1* | 8/2017 | Klimek ............ H04B 17/27 |
| 2018/0054701 A1 | 2/2018 | Klimek et al. |
| 2019/0132815 A1* | 5/2019 | Zampini, II ............ G06Q 50/06 |

FOREIGN PATENT DOCUMENTS

| | | |
|---|---|---|
| KR | 20030084539 A | 11/2003 |
| KR | 101113052 B1 | 2/2012 |
| WO | 0221429 A2 | 3/2002 |
| WO | 2008135432 A1 | 11/2008 |
| WO | 2015026862 A1 | 2/2015 |
| WO | 2016043388 A1 | 3/2016 |
| WO | 2017040690 A1 | 3/2017 |

OTHER PUBLICATIONS

EPO Examination Report for Application No. 14838745.9, dated Jul. 11, 2018.

(56) References Cited

OTHER PUBLICATIONS

International Search Report and the Written Opinion of the International Searching Authority, Application No. PCT/IB2018/000692, dated Sep. 28, 2018.
International Search Report and Written Opinion for International Application No. PCT/US2017/031811 dated Sep. 1, 2017.
Park, et al. "Multiscale Entropy Analysis of EEG from Patients Under Different Pathological Conditions." Fractais 15, 399 (2007).
Stam et al., Nonlinear Synchronization in EEG and Whole-Head MEG Recordings of Healthy Subjects, date unknown.
"Getting started with LTE Beacon—Estimote Developer", https://developer.estimote.com/lte-beacon/quick-start/, Aug. 6, 2019.
"Reality Matters", The Estimote Team Blog, https://blog.estimote.com/post/172115262320/presence-verification-and-security-is-more-refined, Mar. 29, 2018.
Jung, Chanhsu , et al., "Maximum Power Plus RSSI Based Routing Protocol for Bluetooth Low Energy Ad Hoc Networks", Wireless Communications and Mobile Computing, Dec. 13, 2017, 1-13.
Jung, Changsu , et al., "Topology Configuration and Multihop Routing Protocol for Bluetooth Low Energy Networks", IEEE Access, Dec. 13, 2017, 9587-9598.
International Search Report and Written Opinion of the ISA for Application No. PCT/IB2019/00082 dated Feb. 19, 2020.
U.S. Appl. No. 16/375,836.

* cited by examiner

METHOD AND SYSTEM FOR ASSET MANAGEMENT

CROSS-REFERENCE TO RELATED APPLICATIONS

This application claims the benefit of U.S. Provisional Application No. 62/722,397 filed 24 Aug. 2018, U.S. Provisional Application No. 62/772,534 filed 28 Nov. 2018, and U.S. Provisional Application No. 62/881,766 filed 1 Aug. 2019, each of which is incorporated in its entirety by this reference.

This application is related to U.S. application Ser. No. 15/620,014 filed 12 Jun. 2017, U.S. application Ser. No. 16/271,080 filed 8 Feb. 2019, U.S. application Ser. No. 15/789,767 filed 20 Oct. 2017, U.S. application Ser. No. 15/836,291 filed 8 Dec. 2017, and U.S. application Ser. No. 15/784,774 filed 16 Oct. 2017, each of which is incorporated in its entirety by this reference.

TECHNICAL FIELD

This invention relates generally to the field of wireless communication, and more specifically to a new and useful method for managing an asset in the field of wireless communication.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
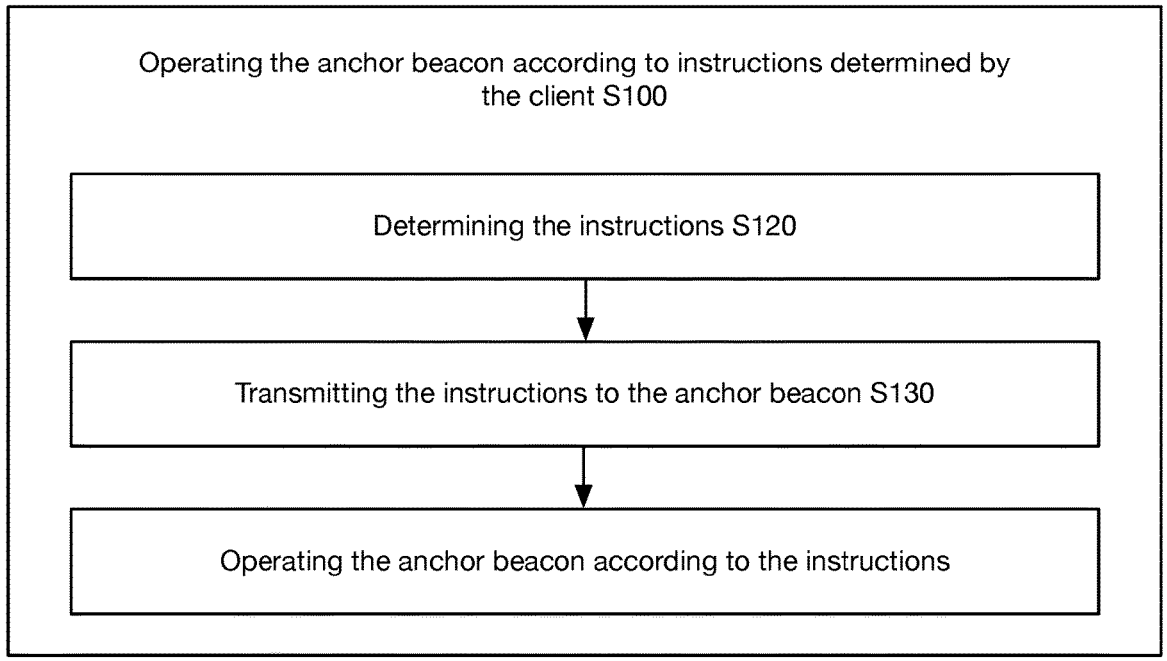
FIG. 1 is a schematic representation of the method.

As shown in FIG. 1, the method includes: operating an anchor beacon according to instructions determined by a client S100, and additionally or alternatively includes operating the anchor beacon according to a learned model S200. The method functions to enable users to specify custom beacon responses (e.g., through user-provided programs), while maintaining centralized beacon population control (e.g., by the remote computing system, beacon registry, etc.)

Figure 3:
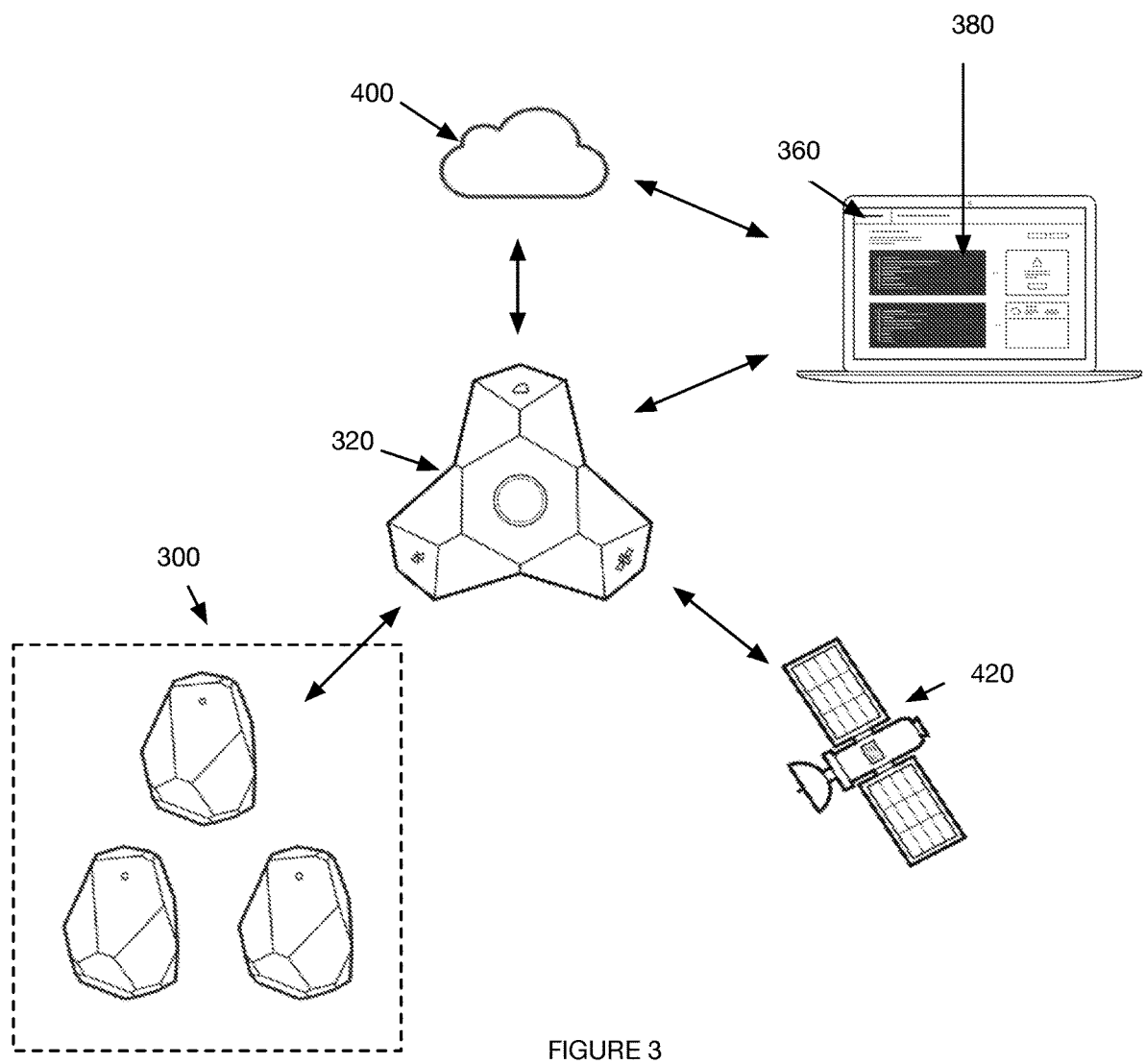
FIG. 3 is a schematic representation of the system.

As shown in FIG. 3, the system 30 preferably includes: a client 360, a program 380, a remote computing system 400, one or more anchor beacons 320, and can additionally or alternatively include one or more secondary beacons 300. The system additionally or alternatively includes any other suitable element.

The method is preferably performed using the system 30, however, the method can additionally or alternatively be performed using any other suitable system.

2. Benefits.

The inventors have discovered that a mobile device can be deployed to aid in asset management.

First, the inventors have discovered that conventional methods to program mobile devices, such as IoT devices, can be challenging. The inventors have developed a system that enables a user (e.g., via a client) to program a beacon (e.g., mobile device) by compiling code (e.g., user-provided code, template functions, etc.) into bytecode, wherein the bytecode can be sent to (e.g., flashed onto; transmitted to, such as via Web Bluetooth™; etc.) the beacon (e.g., after beacon manufacture, after beacon sale). In variants, the client can be a web browser, wherein the code can be written in a web-based programming language (e.g., javascript) using a set of beacon parameter abstractions (e.g., beacon abstractions, location abstractions, etc.), and compiled at the remote computing system into bytecode, wherein the bytecode can be sent to the beacon (e.g., via the client, directly to the beacon via a cellular connection). These variants can be particularly compelling because it allows users to program in a familiar language (e.g., a web-based programming language), and also to use a set of human-understandable abstractions. In these variants, the remote computing system can disambiguate or resolve the abstractions (used for facile programming purposes) into the specific beacon identifier strings, the specific list of beacon identifiers associated with a given geographic identifier, the geofence or geocoordinates associated with the geographic identifier, and/or any other suitable information, wherein the disambiguated information can be compiled into the bytecode and sent to the beacon for execution. Furthermore, this frees beacon memory by reducing the parameters and/or associations stored at each beacon.

Second, in variants, the beacon can be trained to identify events. For example, a beacon can log sensor data during a training session (e.g., while the beacon is in a training mode and the beacon is subjected to the event) and send the sensor data to a remote computing system (e.g., in a batch, streamed, etc.), wherein the remote computing system can generate a model based on the sensor data, compile the model into bytecode, and send the model back to the beacon. In specific examples where the model is being executed on a dedicated on-board processor (e.g., coupled to the IMU, separate and distinct from the main processor, etc.), the model can be received at the main processor and sent to the on-board processor for storage and execution. However, the beacon can be otherwise trained.

Third, the beacon can provide high-accuracy location measurements (e.g., sub-10-cm measurements) in a low-power manner when stationary and/or during translation. In one example, the beacon can determine an initial beacon location using one or more UWB radios (e.g., using time of flight of the UWB signal), determine the amount of beacon translation using an on-board IMU, and determine the beacon location based on the initial beacon location and the IMU readings (e.g., using odometry).

However, the beacon can confer any other suitable set of benefits.

3. System 30.

The system 30 preferably includes: a client 360, a program 380, a remote computing system 400, one or more anchor beacons 320, and can additionally or alternatively include one or more secondary beacons 300.

The system 30 can include one or more secondary beacons 300. The secondary beacon preferably aids in determining the anchor beacon's location (e.g., indoor position; presence within a predetermined geographic region, such as a building; etc.), but can additionally or alternatively provide any other suitable set of functionalities.

The secondary beacon (e.g., venue beacon) is preferably positioned in a venue (e.g., in a manufacturing facility, office building, store, center, vehicle etc.), but can additionally or alternatively be positioned on a venue (e.g., on a vehicle, tent, gate, doorway etc.), on an asset (e.g., person, cart, package, item, etc.), or otherwise positioned. The secondary beacon is preferably statically mounted to the mounting point, but can be transiently mounted to the mounting point. The secondary beacon is preferably associated with the mounting point (e.g., in the beacon registry, maintained by the remote computing system), more preferably representative of the mounting point's location (e.g., geolocation, indoor position, etc.), but can be additionally or alternatively associated with any other suitable information.

In variants, the secondary beacon can have limited processing power and/or functionality. In one example, the secondary beacon operates according to manufacturer-provided, standard bytecode, wherein the user can set variable values (e.g., determining scanning and advertising frequency), but the user cannot specify event detection and transmission. However, the secondary beacon can be otherwise configured.

The secondary beacon is preferably operable during an active session. The active session can be determined by the client, remote computing system, by the secondary beacon (e.g., in response to packet detection, motion detection, presence detection, etc.), and/or otherwise determined. However, the secondary beacon can be otherwise operable.

The secondary beacon is preferably operable between one or more modes. The secondary beacon can operate in each mode at a frequency and according to operation conditions specified by the standard bytecode (e.g., periodically at a predetermined advertising period), but can operate according to predetermined settings, according to settings received from the remote computing system (e.g., wherein the remote computing system can control a limited set of beacon functions, such as advertising schedules, wake schedules, scanning schedules, etc,), or according to any other suitable set of instructions.

The modes can include: an advertising mode, a scanning mode, an offline mode, and/or any other suitable set of modes.

The advertising mode preferably includes using one or more Bluetooth radios to advertise a secondary beacon identifier, but can be otherwise executed. The secondary beacon can optionally transmit a payload (e.g., wherein both the secondary beacon identifier and the payload can be included in a frame broadcast by the secondary beacon), and/or any other suitable information in the advertising mode.

The secondary beacon is preferably operable in a scanning mode. The scanning mode preferably includes using one or more Bluetooth radios to scan for secondary beacon packets, the packets comprising one or more beacon identifiers. The Bluetooth radio can optionally collect signal processing information (e.g., RSSI, TOF, etc.), and/or any other suitable information associated with the received packets.

The secondary beacon is preferably operable in an offline mode. The secondary beacon can operate in the offline mode when the secondary beacon is not in an active session, and/or at any other suitable time. After determining an instruction to operate in the offline mode, the secondary beacon can instruct all sensors and/or radios to operate in the offline mode, and/or a subset of the sensors and/or radio to operate in the offline mode. However, the secondary beacon can additionally or alternatively be operable in any other suitable mode.

Figure 9:
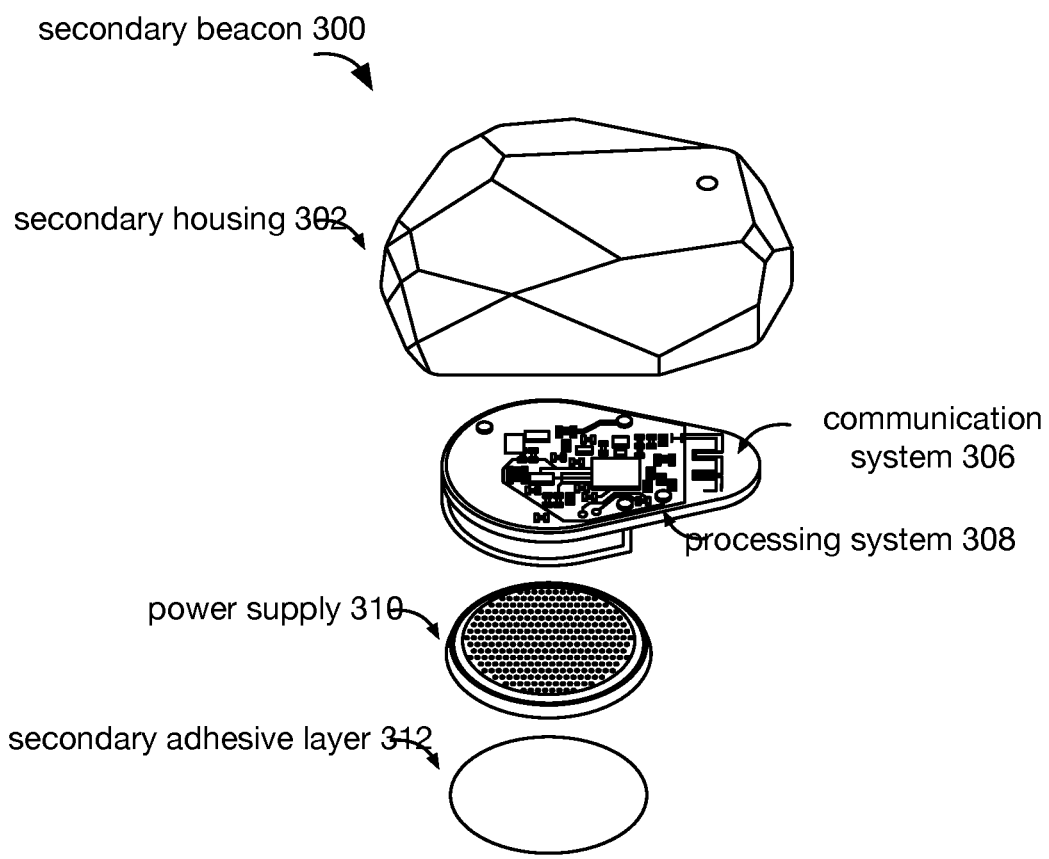
FIG. 9 depicts an example set of components of the secondary beacon 300.

As shown in FIG. 9, the secondary beacon 300 can include one or more communication systems 306 (e.g., Bluetooth radios executing one or more Bluetooth protocol and/or specifications, such as Bluetooth Low Energy (BLE), Bluetooth Classic, Ultra Wide Band, Bluetooth 1.0, 1.1, 1.2, 2.0, 2.1, 3.0, 4.0, 4.1, 4.2, 5.1, etc.), one or more processing systems 308, one or more power supplies 310, one or more secondary adhesive layers 312, a secondary housing 302 enclosing and mounting the aforementioned components, and/or any other suitable component. In a specific example, the secondary beacon consists essentially of one or more: short-range communication systems (e.g., one or more Bluetooth radios, NFC radios, etc.), processing systems, power supplies, inertial sensors (e.g., accelerometers), optionally ambient environment sensors (e.g., light sensors, microphones), and a housing (e.g., with adhesive). However, the secondary beacon can be otherwise configured.

The secondary beacon is preferably associated with a secondary beacon identifier 605. The secondary beacon identifier can be static (e.g., be a static public identifier that can be used by user devices, clients, and/or third-party applications to trigger predetermined actions associated with the secondary beacon's public identifier), be transient or ephemeral (e.g., require a resolver to resolve the transient identifier into the public identifier), and/or otherwise vary. The secondary beacon identifier is preferably advertised within a packet 615 advertised by the secondary beacon, but can be otherwise used.

The association between the beacon identifier, the specific beacon, and any auxiliary beacon information (e.g., beacon location or mounting point information, transient identifier, etc.) is preferably stored by a beacon registry (e.g., managed by the remote computing system), but can be otherwise stored. In one variation, the remote computing system returns information (e.g., location associated with the beacon, mounting point identifier, etc.) associated with a secondary beacon identifier received from the remote computing system from an intermediary (e.g., user device, anchor beacon, etc.). In a second variation, the anchor beacon performs a predetermined set of actions (e.g., user-specified actions, standard actions, etc.) specified by the anchor beacon bytecode in response to receipt of a packet with the secondary beacon identifier. In variants wherein the secondary beacon identifier is secured, the anchor beacon can optionally resolve the secured secondary beacon identifier into the static public identifier (e.g., based on a deterministic calculation, based on a lookup table retrieved from the beacon registry, etc.).

In another variation, the secondary beacon identifier can be encrypted using a secondary beacon key to obtain a secondary beacon token. The secondary beacon key can be stored at both the remote computing system and at the secondary beacon. The secondary beacon identifier can be encrypted at a predetermined interval. The predetermined interval can be based on a clock wherein the clock is shared by the secondary beacon and the remote computing system. For example, a secondary beacon identifier can by encrypted with the secondary beacon key to obtain the secondary beacon token and the secondary beacon token can be advertised by the secondary beacon. After a predetermined period (e.g., every 20 minutes, every hour, etc.), a new secondary beacon identifier can be generated by a random number generator, the new secondary beacon identifier can be encrypted using the beacon key to obtain a new secondary beacon token, and the new secondary beacon token can be advertised by the secondary beacon. However, the new secondary beacon identifier need not be encrypted, or can be otherwise encrypted.

However, the secondary beacon can additionally or alternatively be otherwise configured.

The system 30 preferably includes one or more anchor beacons 320. In variants, the event models, programs (e.g., bytecode), and/or any other suitable data or instruction set determined for a given anchor beacon can be replicated (e.g., pushed to) other anchor beacons 320 in a given population, associated with a specific user account, and/or any other suitable set of anchor beacons.

The anchor beacon preferably includes the components of the secondary beacon, but can additionally or alternatively include any other components.

The anchor beacon preferably includes one or more radios. The radios can include one or more Bluetooth radios (e.g., Bluetooth classic, BLE, etc.), such as those discussed above for the secondary beacon. The radios can include one or more cellular radios (e.g., LTE), short range radios (e.g., NFC, RF), global navigation system radios (e.g., GPS, GLONASS, Galileo, etc.), and/or any other suitable set of radios. The radios can include or share one or more chipsets. However, the radios can additionally or alternatively include any other suitable radio.

Figure 8:
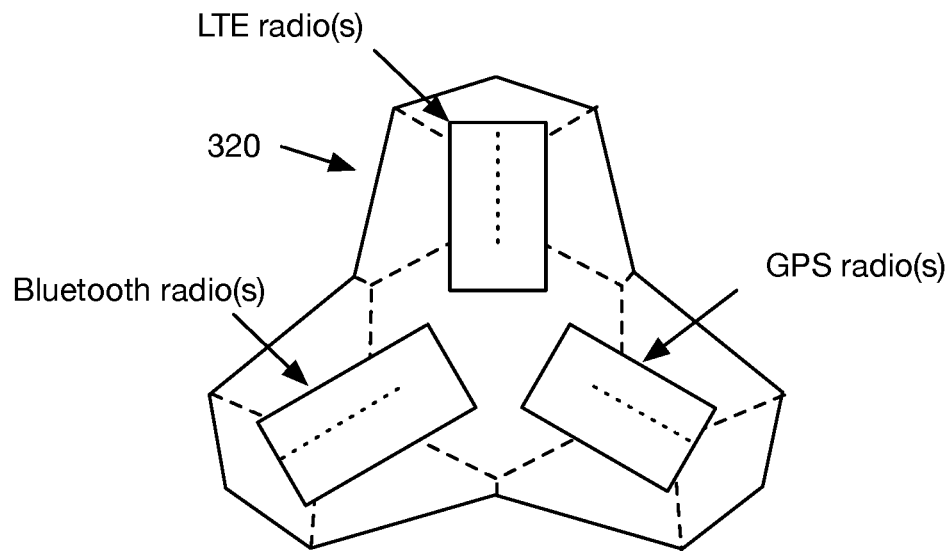
FIG. 8 depicts an example of the radio layout of an anchor beacon.

In variants, the antennas of one or more radios can be arranged on the same plane (and/or be mounted to a common board). The antennas for the respective radios can be: aligned (e.g., arranged in parallel), overlap, be radially distributed (e.g., arcuately distributed about a central point, example shown in FIG. 8), or otherwise arranged.

The anchor beacon preferably includes one or more sensors. The sensors preferably include one or more motion sensors (e.g., IMU, accelerometer, gyroscope), temperature sensors, light sensors, accelerometers, and/or any other suitable sensor. The sensors can share a chipset with the processing system and/or the radios, but can additionally or alternatively have individual chipsets (e.g., separate and distinct from the radio chipset, from the processor, etc.).

In a specific example, the IMU can have a separate, low-power chipset that is operated independently of the main processing system. The low-power chipset can execute one or more models (e.g., event models, learned models, etc.) and/or programs that are specific to the IMU.

The anchor beacon can include one or more processing systems. The processing system can include one or more CPUs, GPUs, co-processors, microprocessors, clocks, storage, and/or any other suitable element. The anchor beacon can include a power source (battery, RF, etc.), a connector (e.g., data and/or port such as USB-c), memory, inputs (e.g., buttons, microphones, etc.), outputs (e.g., lighting, audio), housing enclosing the components of the anchor beacon, and/or any other suitable components. However the anchor beacon can additionally or alternatively include any other suitable components.

In one variation, the anchor beacon includes two or more processors. The first processor (e.g., the main processor) preferably processes bytecode, coordinate sensor operation, coordinates radio operation, and/or performs any other suitable function. The second processor preferably processes machine learning features (e.g., running event model, logging training data, etc.), but can additionally or alternatively process any other suitable feature. The anchor beacon can additionally or alternatively include a third processor (e.g., secure module). The third processor can store security keys, generate security keys, handle payload and/or beacon identifier encryption, and/or perform any other suitable set of functionalities. The anchor beacon can include a housing, computer readable media, battery, a connector and/or any other suitable component.

Figure 7:
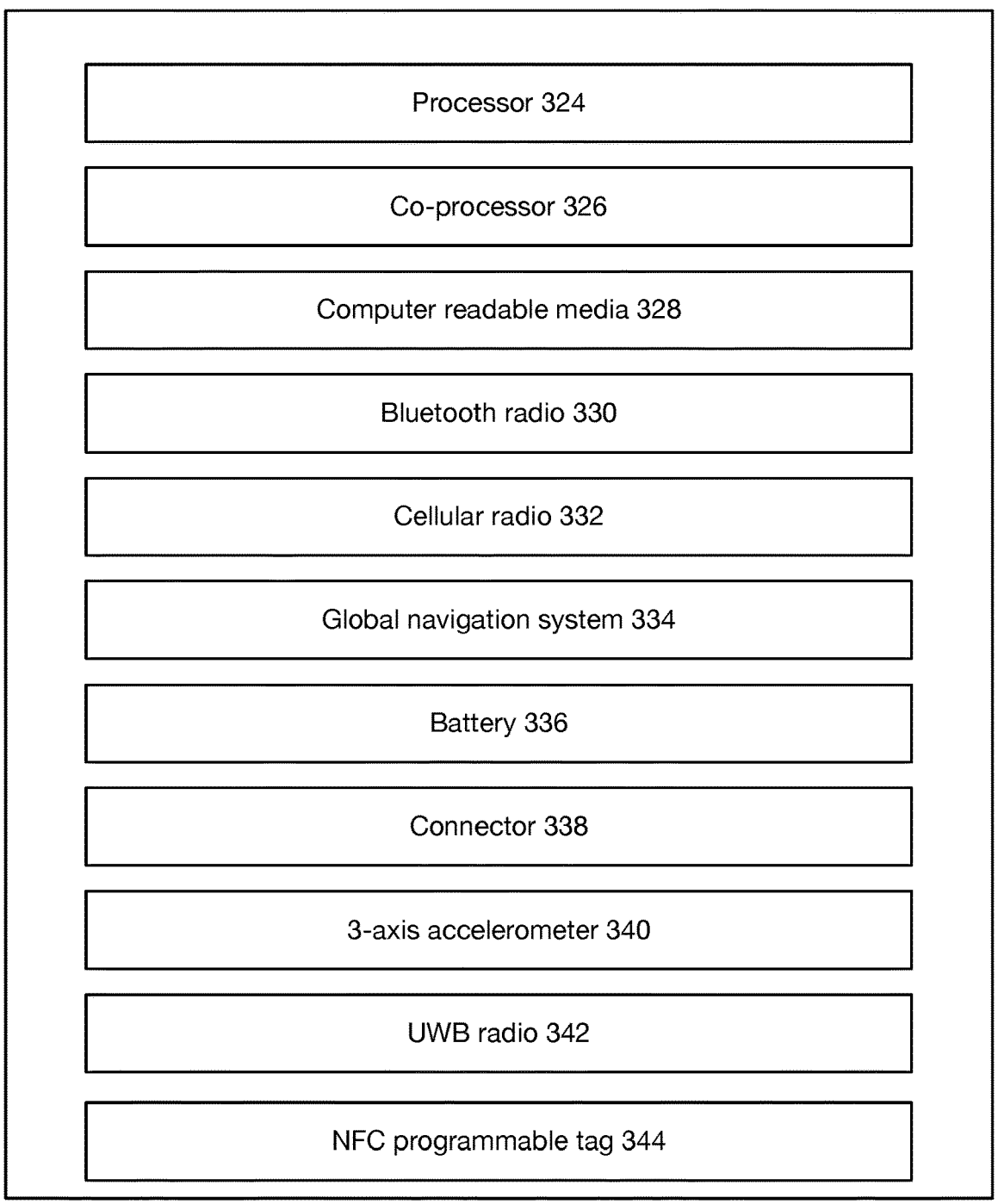
FIG. 7 depicts an example set of components of an anchor beacon.

In one example, as shown in FIG. 7, the anchor beacon consists essentially of: one or more processors 324; one or more co-processors 326, wherein the co-processor(s) can include an AES encryption system, one or more random number generators (e.g., true random number generator for full entropy, or for any other suitable benefit), and/or an asymmetric/symmetric hashing cryptographic system; computer readable media 328 (e.g., RAM, Flash); one or more Bluetooth radios 330 (e.g., BLE, Bluetooth classic, UWB radio 342, etc.); a global navigation system 334 (e.g., that receives signals from one or more satellites 420); a cellular radio 332 (e.g., modem); a battery 336 (e.g., lithium-ion rechargeable battery); connector 338 (e.g., USB standard, such as USB-C, USB-A, micro-USB, etc.; for data transfer and/or power transfer), a NFC radio (e.g., NFC programmable tag 344); a 3-axis accelerometer 340 or IMU; an optional programmable push button 348; programmable outputs, such as RGB LEDs; temperature sensor; adhesive layer 346; and housing 322 (e.g., durable non-toxic silicon; encloses most or all of the aforementioned components). However, the anchor beacon can be otherwise configured.

The anchor beacon preferably functions to track an asset. The anchor beacon can execute one or more programs stored on-board the anchor beacon. The anchor beacon can transmit event data to a remote computing system.

The anchor beacon preferably operates according to the instructions from bytecode 410. The bytecode is preferably based on code determined by the client, but can be otherwise determined. The code is preferably processed into (e.g., compiled into) bytecode by the remote computing system, but can additionally or alternatively be processed by the client, by a programming device, or otherwise processed. The anchor beacon is preferably user programmable, wherein the user can specify a predetermined set of functions and/or processes and the system (e.g., the remote computing system) can convert the user-specified programs into machine-executable code that is executable by the limited processing capabilities of the anchor beacon, but the anchor beacon can be otherwise programmed.

Similar to the secondary beacon, the anchor beacon can be operable between one or more modes. The anchor beacon can operate in each mode at a frequency and according to operation conditions specified by the bytecode (e.g., advertising schedules or periods, scanning schedules or periods, transmit schedules or periods, wake schedules, sleep schedules, etc,), but can operate according to predetermined instructions, according to instructions or trigger events received from the remote computing system (e.g., wherein the remote computing system or bytecode can control the set of beacon functions), or according to any other suitable set of instructions. Examples of anchor beacon operation modes include: a training mode (e.g., wherein the anchor beacon collects training data while being subjected to an event), a processing mode (e.g., operating according to the bytecode and/or an event model 515, which can be received from the remote computing system or other compiler), a scanning mode, an advertising mode, a transmitting mode, an offline mode, and/or any other suitable The anchor beacon can also function to sample data from on-board sensors, receive secondary beacon packets (e.g., in the scanning mode), resolve individual beacon identifiers from the secondary beacon packet(s), determine the secondary beacon's location relative to the anchor beacon (e.g., based on the RSSI, AOA, time of flight, etc.), determine the ego location (e.g., location of the anchor beacon) based on known locations of each of a set of secondary beacons (e.g., that the packets are received from) and the respective estimated separation distance (e.g., determined based on the RSSI), communicate with the remote computing system via a cellular radio, communicate with the client (e.g., via web Bluetooth, through the remote computing system, etc.), but can additionally or alternatively provide any other suitable set of functionalities.

Figure 5:
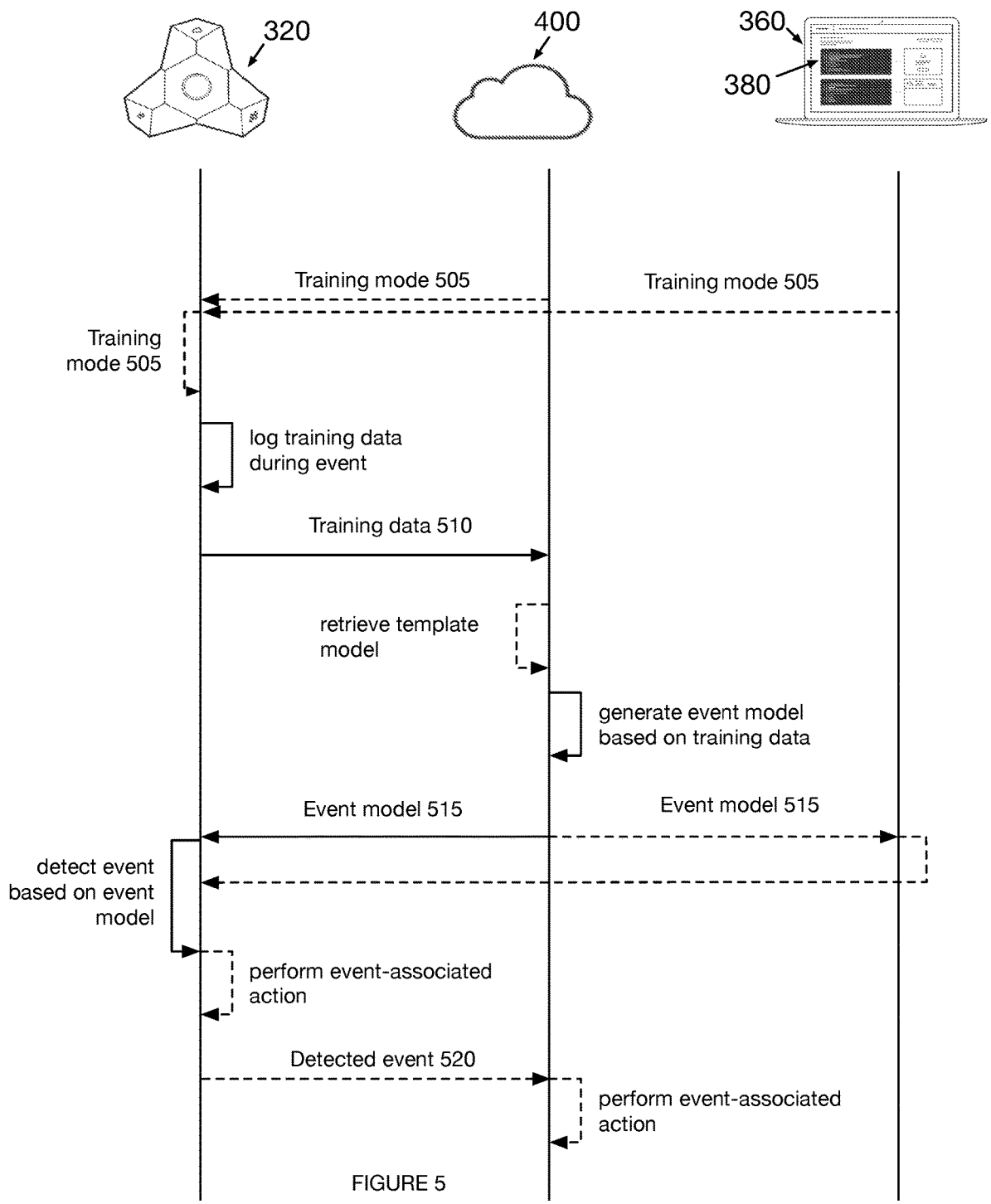
FIG. 5 is an example of information shared between components of system associated with S200.

The anchor beacon is preferably operable in a training mode 505, which functions to generate an event model based on training data. The anchor beacon operates in the training mode in response to a training mode command (e.g., received from the user, received from a remote computing system, detected at the anchor beacon, etc.). The training mode preferably includes logging event data related to a predetermined event (e.g., user-specified event) wherein the anchor beacon is subjected to the event (e.g., the user or other manipulator actuates the anchor beacon). The log data can be streamed or periodically transmitted to the remote computing system (e.g., via the client, via an intermediary device, directly using the cellular radio, etc.). An example is shown in FIG. 5. Each successive instance of the event can be identified by the anchor beacon (e.g., wherein the anchor beacon labels each instance in response to receipt of a training mode command or other trigger), identified by the user (e.g., before or after each instance; after the data is uploaded to the remote computing system, etc.), and/or otherwise identified.

The event model is preferably determined by the remote computing system (example shown in FIG. 5), but can be determined by the client, an intermediary device, or any other suitable computing device. The event model is preferably determined based on the training data from the training session, but can be determined based on historic data, population data, and/or any other suitable data. The event model is preferably determined based on a template model (e.g., for a specific processor, for the IMU processor, for the event, etc.), but can be determined based on a reference model (e.g., for the event, a prior model, etc.), or otherwise determined. The event model is preferably sent to the anchor beacon (e.g., directly via the cellular connection, via the client, via an intermediary device, etc.), but can be executed by the remote computing system (e.g., wherein anchor beacon data is streamed to the remote computing system) or otherwise stored and executed. In variants, the event model can be addressed to a specific processor for storage and/or execution (e.g., the IMU processor).

The anchor beacon is preferably operable in a processing mode 530. The processing mode functions to detect one or more events 520. The events are preferably detected based on measurements sampled by sensors on-board the anchor beacon, but can be detected based on any other suitable data. The events are preferably detected based on the bytecode, but can additionally or alternatively be detected based on an event model, or otherwise detected. The anchor beacon can operate in the processing mode continuously, when in a wake state, in response to occurrence of a precursor event, or at any other suitable time.

The anchor beacon is preferably operable in a scanning mode. The scanning mode preferably includes using one or more Bluetooth radios to scan for secondary beacon packets, wherein the packets include one or more beacon identifiers. The Bluetooth radio can collect signal processing information (e.g., RSSI, TOF, etc.), and/or any other suitable information. However, the scanning mode can be otherwise executed.

The anchor beacon is preferably operable in an advertising mode. The advertising mode preferably includes using one or more Bluetooth radios to advertise anchor beacon identifier and additionally or alternatively a payload 420, and/or any other suitable information. However, the advertising mode can be otherwise executed.

Figure 4:
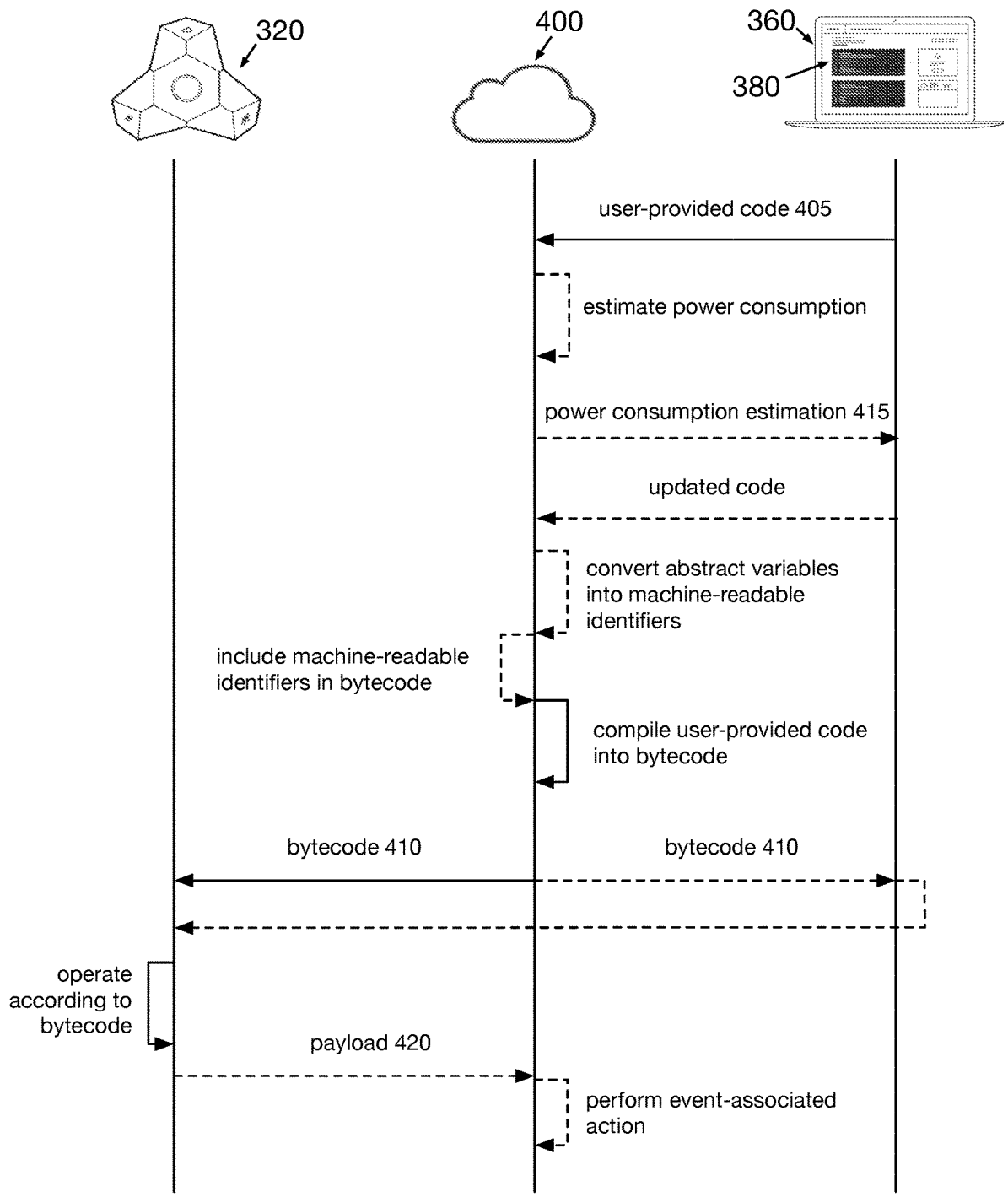
FIG. 4 depicts variants of information shared between components of system.

The anchor beacon is preferably operable in a transmitting mode. The transmitting mode preferably includes using one or more cellular radios (or other long-range radios) to transmit the payload 420 to the remote computing system (example shown in FIG. 4), but can additionally or alternatively transmit any other suitable information to any other suitable entity.

The anchor beacon is preferably operable in an offline mode.

In one variation, the anchor beacon operates in the offline mode based on an IMU event. An IMU event can be if the acceleration is below a predetermined threshold, such as zero (e.g., anchor beacon is not moving) for a predetermined period of time. After determining that the acceleration is below the predetermined threshold, the anchor beacon can instruct all sensors and/or radios to operate in the offline mode, and/or a subset of the sensors and/or radio to operate in the offline mode.

In a second variation, if the acceleration is above a predetermined threshold (e.g., the same or different from the offline threshold), such as not zero (e.g., the anchor beacon is moving), the anchor beacon can instruct all sensors and/or radios to wake (and operate according to the bytecode). Alternatively or additionally, the anchor beacon can operate in the wake mode in response to the motion satisfying an event model. For example, the IMU can detect a predetermined motion pattern, and/or the event model can detect event occurrence based on the anchor beacon's sensor data, such as an airplane take off and landing. After detecting the motion pattern or event occurrence, such as after the airplane is in the air, the anchor beacon can switch all the sensors and/or radios to the active mode, and/or operate according to (the remainder of) the bytecode.

However, the anchor beacon can be operable in any other suitable mode.

In a first example, the anchor beacon can advertise the anchor beacon identifier. In a second example, the anchor beacon can scan for beacon packets comprising associated beacon identifiers. In a third example, the anchor beacon can perform range finding by leveraging RSSI (e.g., BLE, Bluetooth, etc.) and/or time of flight (UWB, classic, etc.). In this example, the anchor beacon can determine the ego location on-board the anchor beacon, transmit the requisite information (e.g., secondary beacon identifier, RSSI, etc.) to the remote computing system, or otherwise determine the ego location.

In a fourth example, the anchor beacon can determine its outdoor position using the GPS system and transmit coordinates to the remote computing system at a predetermined frequency. The coordinates can be used to track the anchor beacon (e.g., at the remote computing system), wherein the anchor beacon is associated with an asset.

In a fifth example, the anchor beacon can determine its outdoor position using the GPS system and refine the outdoor position using relative positioning (e.g., to secondary beacons; with odometry, using the IMU measurements, etc.).

In a sixth example, the anchor beacon can determine indoor position using UWB radio (e.g, x, y, z coordinates; using time of flight (TOF), etc.). Over time, the anchor beacon can optionally use odometry associated with IMU to refine the indoor position.

In a seventh example, the anchor beacon can encrypt a payload (sensor data, identifier, event model, and/or any other suitable data). The anchor beacon can send the payload to the remote computing system, a secondary beacon, the client, or any other suitable entity. The anchor beacon can encrypt the payload using a symmetric key protocol, an asymmetric key protocol, or any other suitable encryption scheme. For example, the remote computing system determines a public key and associated private key and sends the public key to the anchor beacon. The anchor beacon receives the public key, generates a session key using the random number generator, encrypts session key using the public key, and transmits ciphertext of session key to the remote computing system. At the remote computing system, decrypt the ciphertext using the private key to obtain the session key. At anchor beacon, encrypt payload using the session key and remote computing system can receive and decrypt the payload using the shared session key.

In an eighth example, the anchor beacon can enter a hibernation mode as the battery level starts to decrease past an operable level. The LED can be programmed to blink at a predetermined period (e.g., every 30 seconds, 5 minutes, etc.). During hibernation mode, the clock can continue to operate. The sensors and/or radios can operate in the offline mode.

However the anchor beacon can additionally or alternatively include any other suitable component, and/or operate in any other suitable manner.

The one or more anchor beacons and the one or more secondary beacons can interact. For example, the anchor beacon can be placed on an asset in a facility and secondary beacons can be placed at different locations in the facility. The secondary beacons can advertise their beacon identifiers and the anchor beacon can scan for the secondary beacon packets. Using the packets, the anchor beacon can determine its position based on RSSI (or TOF) in the facility. When the anchor beacon is loaded into a vehicle, the anchor beacon can receive satellite information from the GPS system and send the satellite information to the cloud (e.g., remote computing system). Then at a second facility, wherein the second facility includes secondary beacons, the anchor beacon can detect its indoor position based on the secondary beacons.

In another example, the anchor beacon can be attached in a vehicle (e.g., truck, van, car, airplane, pod, etc.), such as on the ceiling or side, and secondary beacons can be placed on assets wherein assets are loaded into the vehicle.

In another example, the anchor beacon can be attached to the inside of a vehicle, and scooters or any other suitable asset can be placed in vehicle. The asset can advertise identifiers to the anchor beacon and anchor beacon can transmit the asset identifiers to the remote computing system. The remote computing system can communicate with the user device to determine the number of assets and associated asset identifiers in vehicle and/or any other suitable information (e.g., battery levels of scooters, battery level of anchor beacon, etc.).

In another example, the anchor beacon attached to the outside of a vehicle (e.g., bus, van, pod, etc.). A secondary beacon can be attached to an asset (e.g., person, object, animal, etc.).

In another example, a secondary beacon can be placed at an entrance of a room, and the anchor beacon can be connected to an entity (e.g., human such as a janitor).

However, the one or more beacons can otherwise interact.

The system preferably includes one or more clients 360. The client preferably functions as an interface for a user to generate and send abstract code 405 to the anchor beacon (e.g., directly, indirectly via a remote processing system). The client can function as a user interface for the user to generate programs responsive to events generated by the anchor beacon. The client can receive program characteristics (e.g., battery management estimation 415). The client can provide features such as syntax highlighting, auto-completion, pre-written snippets (e.g., functions, variables, etc.), and/or any other suitable feature. The client can additionally or alternatively provide any other suitable set of functionalities.

The client is preferably connected to the remote computing system. The client can be in the remote computing system, separate from the remote computing system, or otherwise positioned. The client can additionally or alternatively be connected (e.g., wirelessly connected, wired) to the beacons to be programmed (example shown in FIG. 3). The client is preferably operable as an interface for a user to enter code. The user-entered code can be processed by the remote computing system into bytecode 410. In variants, the remote computing system can optionally determine a battery management estimation of the bytecode on a specific beacon (e.g., the anchor beacon, secondary beacon, etc.). The power estimation can be reported to the user via the client (e.g., while the user is developing the code, after the user developed the code, or at any other suitable time). The bytecode can be read by the beacon (example shown in FIG. 4). However, the client can be otherwise configured.

The client is preferably a browser application, but can additionally or alternatively be a native application, desktop application, or any other suitable application. In variants where the client is a browser application, the browser can communicate with the beacons using web Bluetooth or any other suitable protocol.

In an example, the client includes pre-designed template applications (e.g., GPS tracker, location to slack, alert button, Button and LED, Beacon Info, cellular location, cell tower scanner, BLE Scanner, etc.).

However, the client can additionally or alternatively include any other suitable components.

The system preferably includes one or more programs 380. The program is preferably bytecode compilations of user code, wherein the user code is generated by a user (e.g., user-generated code). The user's code is preferably received at the client. The user's code is preferably abstract, but can be otherwise written. The abstract code is preferably in any suitable language, including: web-based programming languages (e.g., JavaScript, Node.js, Ruby, PHP, Golang, HTML, java, python, etc.), native programming languages (e.g., C, C++, etc.), and/or any other suitable programming language.

The abstract code preferably contains one or more variables associated with a beacon (e.g., secondary beacon and/or anchor beacon) (e.g., surfaced by an API). The variables can include scanning control (e.g., on, off, scanning frequency), advertising control (e.g., on, off, scanning frequency), GPS control, reading from on-board sensors (e.g., sampling frequency), input reading (e.g., button press responses), output control, and/or any other suitable readout or control parameter.

The abstract code can include beacon population parameters. The beacon population parameters can include human-understandable abstractions (e.g., representation that can be naturally read by humans) such as abstract variables or references associated with one or more beacons (e.g., secondary beacons and/or anchor beacons). The abstract variables are preferably associated with the disambiguated information (e.g., beacon identifier or string, geolocation lat/long coordinates, etc.) by a user account associated with the beacon (e.g., beacon owner), but can additionally or alternatively be automatically associated, learned, or otherwise associated. Examples of abstract variables associated with the beacons include: a human-readable name for the beacon(s), a human-readable identifier for a set of beacons, a human-readable identifier for a geographic location associated with a set of beacons, and/or any other suitable variable. Specific examples include: a beacon name instead of using the specific beacon identifier such as the identifier assigned at manufacturing, determined at beacon, etc.; a geographic identifier or venue name instead of listing all beacons associated with a given venue, and/or any other suitable population parameter.

The abstract code is preferably compiled by the remote computing system (e.g., wherein the client sends the abstract code to the cloud, the cloud compiles the code into bytecode, and sends the bytecode to the beacon), but can additionally or alternatively be compiled at the client or otherwise compiled.

Figure 6:
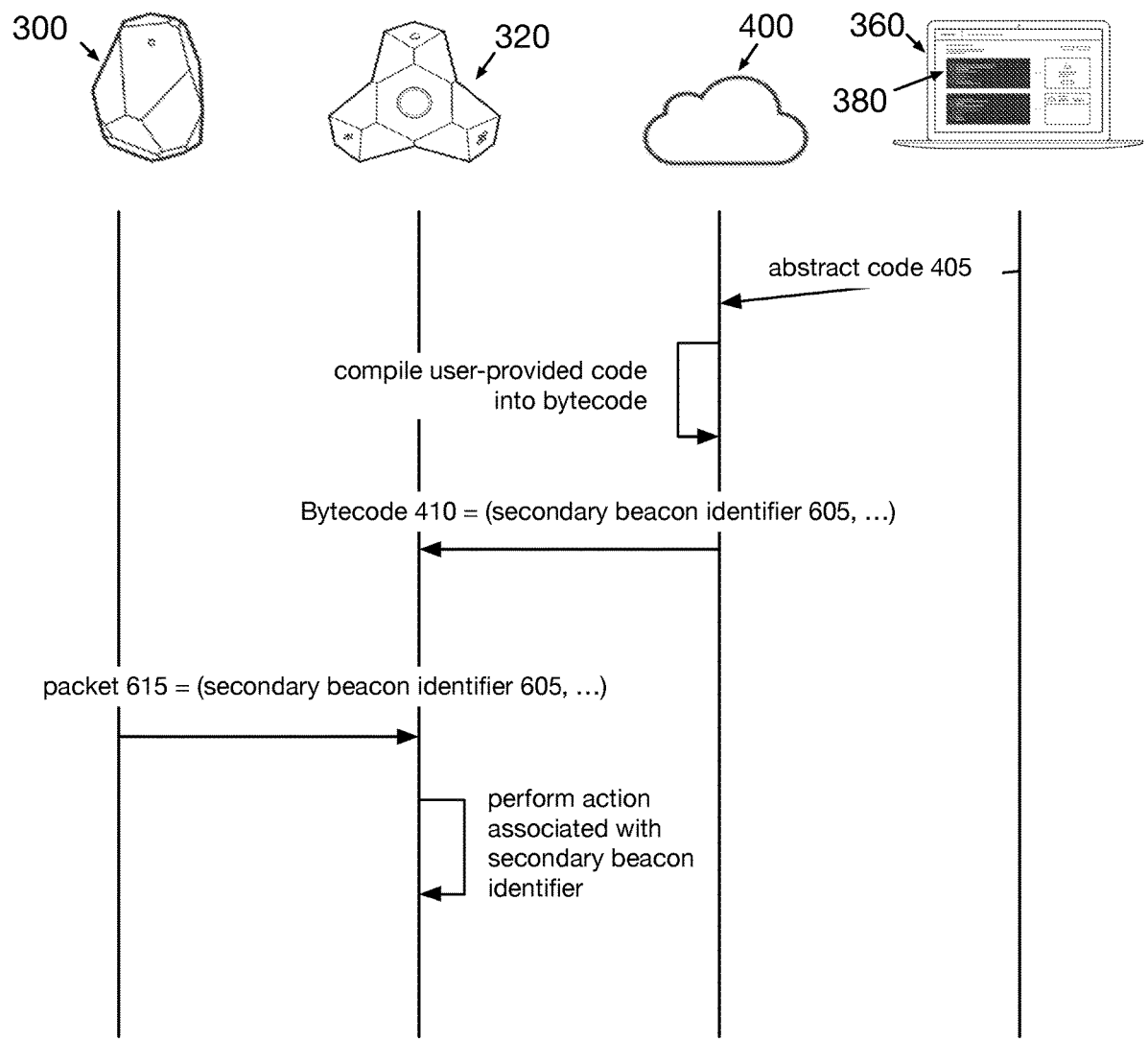
FIG. 6 depicts variants of information shared between components of system.

In one variation, the remote computing system can optionally disambiguate the abstract variables into machine-level representations, and/or compile the machine-level representations into the bytecode (example shown in FIG. 6). In variants, this hardcodes the beacon information (e.g., beacon identifiers, locations, hidden identifier resolution algorithms, etc.) into the bytecode. The remote computing system can disambiguate the abstract variables based on a lookup table, using semantic learning, and/or any other suitable disambiguation method. In one example, the remote computing system can include a beacon registry (e.g. lookup table, database, etc.) that associates the abstract variables with beacon information, such as beacon identifiers (e.g., alpha-numeric string, manufacturer identifier, public identifier, UUID with major and minor values, etc.) for beacons (e.g., for secondary beacons, anchor beacons, static beacons, etc.). The beacon registry can optionally associate the beacon(s) with: beacon groups, geographic locations (e.g., latitude, longitude, geofence identifier, geographic region, etc.), and/or any other suitable data. Examples of the abstract variables include: a user-assigned name for the beacon (e.g., "conference room), a geolocation identifier (e.g., "home," "SFO airport," etc.), a user-assigned name for a beacon group (e.g., "shipping yards"), or any other suitable abstract variable. In a second example, the remote computing system can disambiguate an abstract geographic reference (e.g., "Denver") into a set of geolocations or a geographic region (e.g., set of latitude, longitude, and optionally altitude values). However, the abstract variables (e.g., human-readable descriptors) can be otherwise disambiguated into any other suitable machine-readable representation (e.g., numeric code, references, numeric addresses, etc.)

The abstract code is preferably compiled into bytecode (e.g., microcode), machine code, or compiled into any other suitable code.

In variants, the bytecode includes disambiguated beacon identifiers (e.g., associated with a specific beacon name, set of beacon identifiers associated with a predetermined geofence or geographic identifier). In these variants, the beacon can automatically respond (according to the bytecode) to receipt of packets from the beacons identified in the bytecode. An example can be seen in FIG. 6.

The abstract code can additionally or alternatively include a cloud program. The cloud program preferably functions to respond to events received from the anchor beacon, but can additionally or alternatively respond to events received from any other suitable device (e.g., user device). The cloud program is preferably stored in the remote computing system, but can additionally or alternatively be stored in the client or otherwise stored. The cloud program can be: generated by the user, standard code, or otherwise determined. The cloud program can be the same language as that used to generate the beacon program, or any other suitable language. The cloud program can include serverless architecture features (e.g., Lambda™ expressions), dedicated server architecture, or be otherwise implemented. The cloud program can include one or more beacon identifiers, one or more events and/or event types, a response (e.g., a response to the event), and/or any other suitable information. For example, a response can include notifying a third party. Notifying a third party can include sending a notification, using communication credentials (e.g., an authentication token, an authentication identifier, etc.), to a predetermined set of endpoints. In a specific example, a button press event can be detected by the anchor beacon and reported to the remote computing system. In response to the button press event, the remote computing system sends a notification (e.g., message) to a user's device using credentials associated with the Twilio API or any other suitable API.

In an example, while the user is developing instructions in the client, the reomote computing system can process the user code and provide a resource estimation (e.g., power consumption estimate, battery lifetime profiler) to the user (e.g., based on the beacon components associated with different functions and/or calls, and the estimated power consumption for each of the identified beacon components). Additionally or alternatively, the cloud can determine code refactoring and suggest the code refactoring to the user through the client.

However, the abstract code can additionally or alternatively include any other suitable components and/or be otherwise configured.

The system can optionally include one or more remote computing systems 400. The remote computing system can function to maintain a global database (e.g., the beacon repository) of beacon information (e.g., for the anchor beacon(s), the secondary beacons, etc.). The remote computing system can function to process (e.g., compile) code from the client into bytecode and/or transmit bytecode to one or more beacons. Processing the code received from the client into bytecode can be based on the known knowledge of the world (e.g., beacon identifiers and locations) and/or any other suitable data.

In one variation, the remote computing system identifies abstract variables in the abstract code; determines the machine representation for the abstract variable based on: the abstract variable value, the beacon population associated with the user providing the code (e.g., the user's account), and/or any other suitable information; and compiles the abstract code into bytecode using the machine representations for the abstract variables.

The remote computing system can function to generate an event model. The event model can be determined from a set of training data (e.g., sampled by the anchor beacon, predetermined data from a second anchor beacon, pre-determined data from any other suitable beacon, synthetic data, etc.), and a template model (e.g., decision tree, neural network, regression, etc.), or otherwise determined. Training data can be sampled by the beacon while in the training mode, sampled during typical operation, or otherwise sampled. The remote computing system can optionally process the training data to determine positive and negative samples associated with the event. The template model can be received from a third party associated with a chipset (e.g., a model specifically configured for the chipset), retrieved from a database, and/or otherwise determined. The remote computing system can determine a (trained) model based on the training data, and/or any other suitable data (e.g., predetermined data such as from other beacons). The event model can be compiled into model bytecode, or otherwise compiled. The model bytecode can be transmitted to the beacon. The beacon can store the model in computer readable media. The model can be stored by the main processing system, at a sensor-specific processing system, or at any other suitable system.

The remote computing system can function to manage beacon default settings (e.g., advertising, transmit power, SSUID on/off, toggle functionalities, control payload), manage user access to the beacon (e.g., verify that the user pushing code to the beacon is authorized and/or logged in with the correct credentials), and/or otherwise manage the beacon(s).

The remote computing system can function to store beacon keys (e.g., complimentary to beacon keys), store authentication tokens (e.g., for third-party applications), such as communication tokens used to send notifications to the user or another endpoint, and/or any other suitable set of keys.

The remote computing system can function to determine a scanning device's location based on one or more known locations for the advertising beacons and a distance indicator (e.g., RSSI) of the advertisement signal received at the scanning device from the advertising beacon. For example, the remote computing system can trilaterate a device's location (e.g., anchor beacon location, user device location) based on: the beacon identifiers from packets received by the device (e.g., secondary beacon identifiers, anchor beacon identifiers, etc.), the known locations associated with the beacon identifiers, and the distance indicators for each packet.

The remote computing system can function to perform actions based on (e.g., responsive to) events detected at the anchor beacon (e.g., send a message to a user device, management entity, or any other suitable message receiver). The actions are preferably performed according to a cloud program provided by the user, but can additionally or alternatively be performed in response to satisfaction of a set of conditions (e.g., beacon event occurrence), or at any other suitable time.

However, the remote computing system can additionally or alternatively provide any other suitable set of functionalities.

The remote computing system can be a remote server system, a mobile device, a laptop, a smartphone, a distributed computing system, and/or any other suitable system.

The remote computing system can store a global database of beacon information. The beacon information can include: secondary beacon identifiers, anchor beacon identifiers, the geographic location (e.g., absolute or relative) associated with the beacon, abstract variables associated with the beacon identifiers (e.g., for a given beacon management entity), anchor beacon state (e.g., battery level, etc.), anchor beacon operation parameters (e.g., advertising schedule, etc.), management entity and/or user account associated with the beacon, and/or any other suitable information.

In one variant, the beacon identifiers (e.g., secondary, anchor) can be updated. For example, the secondary beacon can generate a new secondary beacon identifier, advertise a packet comprising the new identifier 615. The packet can be received at the anchor beacon and forwarded to the remote computing system. The remote computing system can update the global database with the new generated secondary beacon identifier. An example can be seen in FIG. 6.

The remote computing system can store an authentication token. The authentication token can be used to send messages to third party devices (e.g., the third party device could be associated with the client) in association with the user account. In one variation, the authentication token is a Twilio authentication token.

However, the remote computing system can additionally or alternatively be otherwise configured.

4. Method.

The method preferably functions to track an asset's location and/or state. The method is preferably performed by the system discussed above, but can additionally or alternatively be performed by any other suitable system. The method is preferably performed during an active session wherein the active session can be determined by the client, remote computing system, or be otherwise determined.

The method preferably includes operating the anchor beacon according to instructions determined by the client S100. S100 preferably functions to enable the anchor beacon to operate according to client specified instructions (e.g., user code). The instructions can be determined for the anchor beacon: before the anchor beacon is deployed (e.g., positioned on an asset), after the beacon is deployed, or at any other suitable time, and/or periodically updated based on bytecode wherein the period is determined by the client.

S100 can include determining the instructions S120. S120 can include: receiving abstract code at the compiling system (e.g., remote computing system) from the client, wherein the user enters the instructions into the client. The compiling system can be: a user device (e.g., laptop, desktop, etc.), browser, remote computing system, and or be any other suitable system. The instructions can be the program, wherein the program includes the abstract code and additionally or alternatively includes the cloud program. The abstract code can be compiled and/or disambiguated, as discussed above, into bytecode. However the instructions can be otherwise determined.

S100 can include transmitting the bytecode to the anchor beacon S130. The one or more anchor beacons can be identified in the abstract code, be the anchor beacons connected (e.g., wirelessly) to the client, be anchor beacons selected by the user, be anchor beacons associated with the user (e.g., with the user account), or be any other suitable set of anchor beacons.

Transmitting can include directly transmitting the bytecode to the anchor beacon(s) (e.g., via a cellular connection, wherein a signal can be sent to the anchor beacon to turn on the beacon's onboard cellular radio, wherein the bytecode can be transmitted during the next scheduled cellular radio operation period, etc.); indirectly transmitting the bytecode to the anchor beacon(s) (e.g., via web Bluetooth, via the computing system running the client, via a computing system wirelessly connected to the beacon, or any other suitable connection etc.), and/or otherwise transmitted.

Determining the instructions can include storing the bytecode at the one or more anchor beacons. The bytecode can be stored in memory, and/or be otherwise stored. However, determining the instructions can additionally or alternatively include any other suitable elements.

S100 can include executing the bytecode on the anchor beacon. The bytecode can be processed at the beacon by the anchor beacon's first processor but can additionally or alternatively be processed by any other suitable processor. In one example, the bytecode can instruct the anchor beacon to use the Bluetooth radio to advertise both iBeacon and Eddystone at the same time. In a second example, the bytecode can instruct the anchor beacon to detect a button press event and in response to the event, read the GPS position and send the GPS position to the remote computing system using the cellular radio.

In one example, the client determines instructions and the remote computing system compiles the instructions into microcode (e.g., bytecode), wherein the instructions specify detecting that the button on the anchor beacon has been pressed. After the button press event is detected at the anchor beacon, the information is enqueued in the payload to be broadcast by the anchor beacon. The payload is transmitted to the remote computing system, the cloud program processes the payload to determine the button has been pressed, and in response to the button press event, the cloud program takes an action (e.g., send a message to the client, and/or any other suitable device, using the authentication token).

However, S100 can additionally or alternatively include any other suitable elements.

The method can additionally or alternatively include operating the anchor beacon according to a learned model at S200. S200 preferably functions to at the anchor beacon: gather training data, and during operation, recognize an event associated with the training data. S200 is preferably performed by the second processor, but can additionally or alternatively be performed by any other suitable processor. S200 is preferably performed in parallel with S100, but can additionally or alternatively be performed at any other suitable time (e.g., before and/or after).

Figure 2:
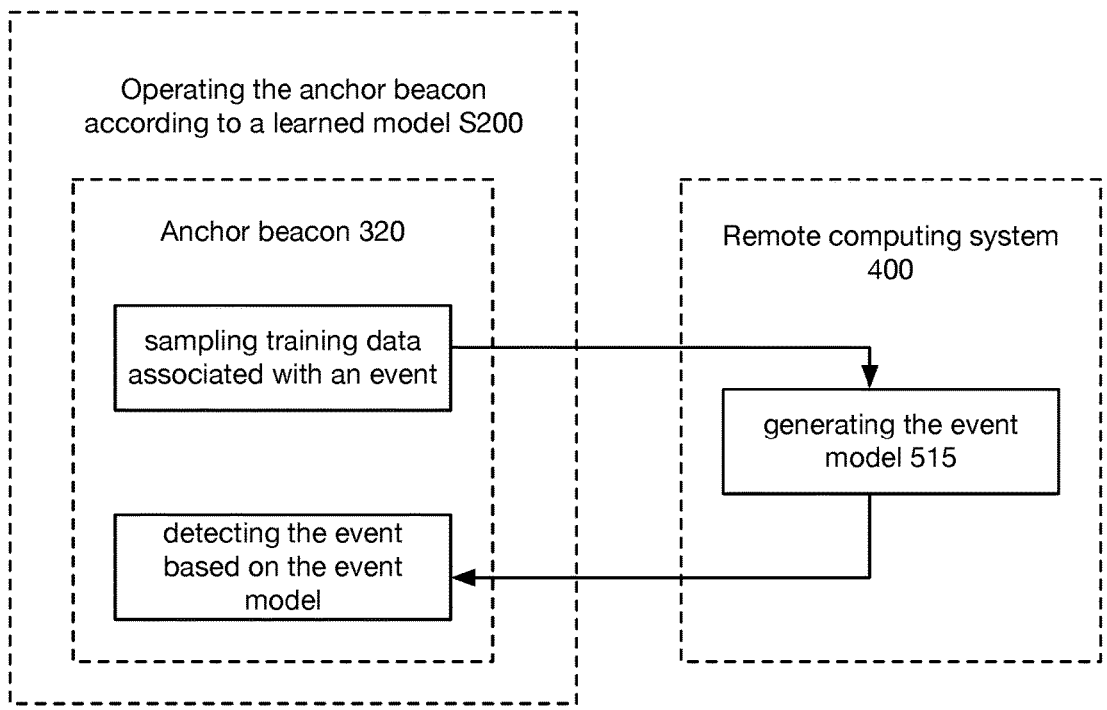
FIG. 2 is a schematic representation of the method.

S200 preferably includes the training mode 505 and the processing mode 530 as shown in FIG. 2. The beacon or event model can be trained as discussed above, or be otherwise trained. S200 can additionally or alternatively include any other suitable modes.

In one example of S200, while the anchor beacon is in training mode to detect a drop event, the user can drop the beacon 10 times. The anchor beacon can record the data and stream the data to the cloud. At the remote computing system, the data can be processed and an event model can be determined. The event model can be transmitted to the anchor beacon. At the anchor beacon, after receiving the event model, the anchor beacon detects a drop event and transmits the event label to the remote computing system.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system, comprising:
an anchor beacon, the anchor beacon comprising:
a first processor operably connected to an inertial measurement unit, wherein the first processor is operable between a training mode and a processing mode, wherein the first processor is configured to log data associated with an event in the training mode, and is configured to detect the event in the processing mode;
a Bluetooth system, wherein the Bluetooth system is operable between a plurality of modes comprising a scanning mode and an offline mode, and wherein the Bluetooth system is configured to scan for a venue beacon packet associated with a venue beacon in the scanning mode; and
a second processor, separate and distinct from the first processor, that is configured to process the venue beacon packet and generate a payload according to custom instructions received from a remote computing system and settings received from the remote computing system;
a cellular system, wherein the cellular system is configured to:
transmit the payload to the remote computing system; and
receive a remote payload from the remote computing system; and
a security system, wherein the security system comprises a random number generator; and
the remote computing system, configured to:
receive user-provided code;
compile the user-provided code into the custom instructions for the anchor beacon, wherein the custom instructions comprise bytecode; and
load the custom instructions onto the anchor beacon.

2. The system of claim 1, wherein, in the training mode:
the anchor beacon:
logs data, associated with the event, from a set of sensors on-board the anchor beacon; and
transmits the data to the remote computing system; and
the remote computing system:
receives the data;
determines an event model based on training data, wherein the training data comprises the data; and
transmits the event model to the anchor beacon.

3. The system of claim 2, wherein the event is associated with the custom instructions, wherein, in the processing mode, the anchor beacon:
receives the event model from the remote computing system;
detects the event based on data from the set of sensors and the event model; and
in response to detecting the event, executes the custom instructions.

4. The system of claim 1, further comprising an authentication token, wherein the authentication token is stored at the remote computing system, wherein the remote computing system transmits a message, using the authentication token, based on an event identifier extracted from the payload.

5. The system of claim 1, wherein the anchor beacon further comprises an ultra-wide band (UWB) radio, the system configured to:

determine an anchor beacon location using the UWB radio; and after determining the anchor beacon location, determine a refined anchor beacon location using the inertial measurement unit.

6. The system of claim 1, wherein the remote computing system is configured to:
identify an abstract beacon variable, associated with the venue beacon, within the user-provided code;
resolve the abstract beacon variable into a beacon identifier for the venue beacon, based on a beacon registry managed by the remote computing system, wherein the beacon identifier represents the venue beacon in the custom instructions.

7. The system of claim 1, wherein the user-provided code is in a web-based programming language.

8. The system of claim 1, wherein:
the anchor beacon, after operating in the scanning mode:
receives a venue beacon packet, wherein the venue beacon packet comprises a venue beacon token, and the venue beacon packet is associated with a received signal strength indicator (RSSI); and
transmits the venue beacon packet and the RSSI to the remote computing system;
the remote computing system, after receiving the venue beacon packet and the RSSI:
obtains a venue beacon identifier by processing the venue beacon token using a beacon key associated with the venue beacon, wherein the beacon key is known by the venue beacon and the remote computing system; and
determine an anchor beacon location for the anchor beacon based on the RSSI and a known physical location associated with the venue beacon identifier.

9. A method for managing an anchor beacon including a Bluetooth radio, and a cellular radio, the method comprising, at the anchor beacon:
receiving bytecode from a remote computing system, wherein the bytecode is compiled by the remote computing system from user-provided code;
determining operation parameters from the bytecode; and
operating according to the operation parameters, wherein operating the anchor beacon comprises operating in at least:
a first mode, comprising:
generating a first payload according to custom instructions received from the remote computing system and settings received from the remote computing system by sampling a plurality of sensors on-board the anchor beacon; and
sending the first payload, by using the cellular radio, to the remote computing system;
a second mode, comprising:
operating the Bluetooth radio in a scanning mode and detecting a venue beacon packet, wherein the venue beacon packet comprises a venue beacon identifier associated with a venue beacon; and
sending a second payload, comprising the venue beacon identifier, with the cellular radio to the remote computing system.

10. The method of claim 9, further comprising at the remote computing system, after receiving the payload from the anchor beacon:
determining occurrence of an event by processing the payload; and
in response to determining occurrence of the event, sending a message to an account using an authentication token stored by the remote computing system.

11. The method of claim 9, wherein the anchor beacon comprises an inertial measurement unit, the method further comprising:
at the anchor beacon, detecting movement of the anchor beacon based on the inertial measurement unit;
in response to movement detection:
operating the Bluetooth radio in the scanning mode, from a Bluetooth offline mode; and
operating the cellular radio in the transmission mode, from a cellular offline mode.

12. The method of claim 9, wherein the remote computing system provides a power estimation for the anchor beacon based on the user-provided code.

13. The method of claim 9, wherein compiling the bytecode from the user-provided code comprises:
identifying an abstract beacon variable, associated with the venue beacon, within the user-provided code; and
resolving the abstract beacon variable into the venue beacon identifier based on a beacon registry managed by the remote computing system, wherein the venue beacon identifier represents the venue beacon in the custom instructions.

14. The method of claim 9, further comprising:
in the second mode, determining a received signal strength indicator (RSSI) associated with the venue beacon packet, wherein the second payload comprises the RSSI;
at the remote computing system:
determining the venue beacon identifier and the receipt signal from the second payload;
determining a location for the anchor beacon based on the RSSI and a physical location associated with the venue beacon identifier.

15. The method of claim 14, wherein the venue beacon identifier is an encrypted token, wherein the encrypted token is based on a venue beacon key associated with the venue beacon, wherein the venue beacon key is known by the remote computing system.

16. The method of claim 9, further comprising:
at the anchor beacon, operating in a training mode, wherein the training mode comprises logging data from at least one sensor from the plurality of sensors;
at the remote computing system:
receiving the data from the anchor beacon;
determining an event model based on the data; and
transmitting the event model to the anchor beacon;
at the anchor beacon, detecting the event based on data from at least the one sensor and the event model.

17. The method of claim 16, wherein the anchor beacon comprises a first processor that executes the first mode and second mode, and a second processor that detects the event based on the event model.

18. The method of claim 16, wherein determining the event model comprises determining the event model based on the data and a predetermined template model.

* * * * *